Oct. 16, 1934.                G. E. GAUS                1,977,123
          LABEL AND A METHOD FOR EMPLOYING THE SAME
                       Filed Nov. 6, 1933
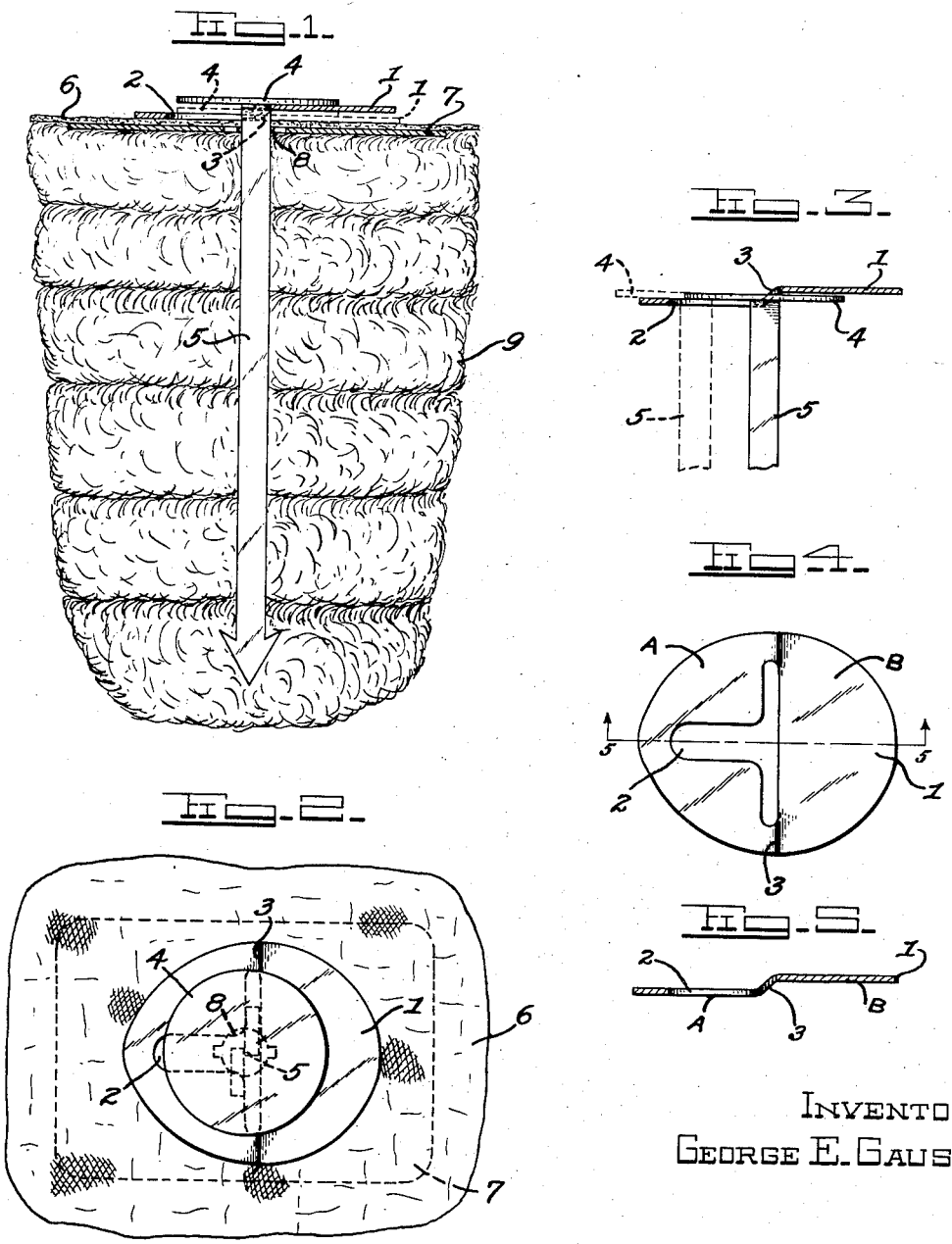
INVENTOR
GEORGE E. GAUS.
BY
                                        ATTORNEY Patented Oct. 16, 1934

1,977,123

UNITED STATES PATENT OFFICE 1,977,123

LABEL AND A METHOD FOR EMPLOYING THE SAME

George E. Gaus, Washington, D. C., dedicated to the free use of the Government and the People of the United States Application November 6, 1933, Serial No. 696,833

1 Claim. (Cl. 40—22)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate this invention to the free use of the Government and the people of the United States.

My invention consists of an improved form of label, and means for securing the label against the outer surface of baled fibrous materials, particularly cotton, whereby the particular bales to which the labels have been applied may be identified in event the customary means of identification are effaced, destroyed or changed.

The object of my invention is to provide a durable label, which can be attached to a bale during the process of baling, and/or recompression, in such a manner that it cannot readily be removed or replaced after the bale-ties have been made secure.

My label, of durable metallic or non-metallic material, is made in the form of a plate, as more fully hereinafter described, to which the legend or illustration may be applied by embossing, indenting or in any other suitable manner. The bale to which my label is applied is provided with attachment means consisting of an anchoring device, such as shown in U. S. Letters Patent #1,922,799, engaged with and embedded within the baled material, said attachment means or identification tag having its free end exposed at the outer surface of the bale.

In order to carry out the purposes of my invention, reference is to be had to the peculiar combination and arrangement of parts as shown in the accompanying drawing forming a part of this specification, in which similar numerals refer to similar parts throughout the several views.

Figure I is a cross-section of an area of a bale of fibrous material to which my label has been applied.

Figure II illustrates an area of the covered outer surface of the completed bale with my label clamped between the bale covering and the outer member of the attachment means.

Figure III illustrates my label connected to the attachment means.

Figure IV is a plan view of my label.

Figure V is a section on line 5—5 of Figure IV.

Label 1, of suitable size and material, visible on the outer surface of bale covering 6, is provided with T-slot 2. T-slot 2 is shaped to permit passage of head 4 and shank 5 of identification tag or attachment means 4—5 within its confines; having its head or cross-piece fall wholly within offset 3, the breadth of its cross-piece exceeding the thickness of identification tag head 4, and its perpendicular body height exceeding the distance from the periphery of identification tag head 4 to the far edge of shank 5. Offset 3, coinciding in breadth with that of the cross-piece of T-slot 2, spans label 1. The lower portion A of label 1, housing the body of T-slot 2, lies in a plane parallel to the plane of the upper portion B of label 1.

For the purpose of explanation of the method of application and operation of my device in connection with an identification tag as covered by U. S. Letters Patent #1,922,799, attachment means 4—5 as illustrated in the drawing will be discussed.

My invention may be practiced at the inception of the process of baling by passing identification tag head 4 through T-slot 2, having shank 5 meet the bottom of the body of T-slot 2, as shown by dotted line in Figure III. Identification tag head 4 is then raised above offset 3 and moved in the direction of the head or cross-piece of T-slot 2, causing the underside of identification head 4 to rest on the upper portion B of label 1, with shank 5 meeting the upper edge of the head or cross-piece of T-slot 2, as shown in Figure I.

With label 1 in the above described position, identification tag head 4, outer face downward, is placed on the pressing surface of the platen or pressing member of a conventional type of baling press. The bale covering 6 consisting, for example, of jute, burlap or cotton bagging, etc., is forced downwardly on identification tag or attachment means 4—5, coming to rest upon the inner surfaces of identification tag head 4 and label 1. Internal lock plate 7, by means of aperture 8, is then forced over the barbed end of shank 5, and slid down said shank 5, lodging upon the inside area of the bale covering material 6. Having label 1 and identification tag or attachment means 4—5 in position, as herein described, fibrous material 9 is introduced into the press box, and the process of baling is performed in the conventional manner.

The customary process of baling effects the envelopment and impaction of identification tag or attachment means 4—5 with fibrous material 9, thereby arresting its removal. It also effects flattening of offset 3 on label 1, thereby preventing subsequent disengagement of label 1 from attachment means 4—5 and also retention of label 1 between identification tag head 4 and bale covering 6, as shown by dotted line in Figure I. Upon completion of baling, label 1 appears on the outer surface of the bale and is secured by compression means between the bale covering material 6 and the underside of identification tag head 4.

My invention may also be practiced at the inception of the process of recompression of baled material, with reference in particular to baled cotton, commonly practiced in reduction of the cubical area of the bale for convenience in shipment. Having a bale prepared for recompressing, with bale ties removed, and identification tag head 4 exposed at the outer surface of the bale, label 1 with its lower portion A facing the surface of the bale is passed beneath identification tag head 4 by means of T-slot 2, causing the bottom of the body of T-slot 2 to contact shank 5. Label 1 is then depressed and moved in a reverse direction, causing the underside of identification tag head 4 to rest on the upper portion B of label 1 with shank 5 meeting the upper edge of the head or cross-piece of T-slot 2. Having the label 1, and identification tag or attachment means 4—5 in the position described, the bale is introduced into a compress, and the relabeling and recompression performed in the conventional manner.

The customary process of recompression effects the impaction of identification tag or attachment means 4—5 with fibrous material 9, thereby arresting its removal. It also effects flattening of offset 3 or label 1, thereby preventing subsequent disengagement of label 1 from attachment means 4—5 and also retention of label 1, between identification tag head 4 and bale covering 6.

Upon completion of rebaling and recompression, label 1 appears on the outer surface of the bale, and is held fast between the bale covering material 6 and the underside of identification tag head 4.

While the foregoing is a preferred embodiment of the means for practicing my invention, I do not wish to be restricted thereto.

Having thus described my invention, I claim as new and desire to secure by Letters Patent:

The combination with a bale having nail-like fastening means embedded therein, of a substantially flexible plate having a slotted offset transverse of said plate adapted for the passage of the head of said nail-like fastening means, said plate also having an elongated slot formed therein, directed toward and communicating with said slotted offset, adapted for the passage of the shank of said nail-like fastening means.

GEORGE E. GAUS.